T. C. PROUTY.
ODOMETER.
APPLICATION FILED AUG. 5, 1913.

1,269,216.

Patented June 11, 1918.
2 SHEETS—SHEET 1.

Witnesses:
C. A. Burnap
Henry A. Parks

Inventor:
Theodore C. Prouty
By Sheridan, Wilkinson & Scott Attys

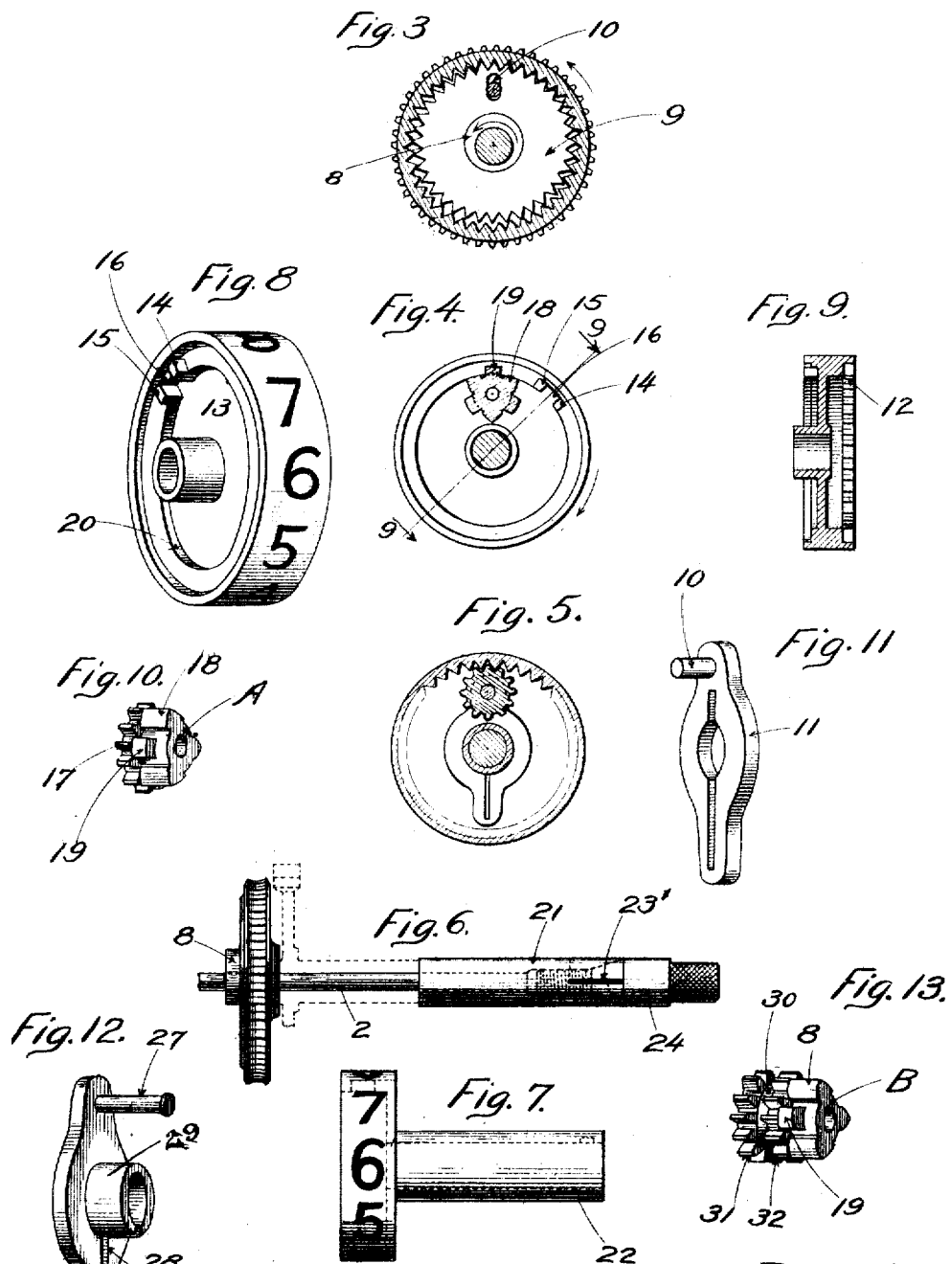

UNITED STATES PATENT OFFICE.

THEODORE C. PROUTY, OF AURORA, ILLINOIS, ASSIGNOR, BY MESNE ASSIGNMENTS, TO THE VAN SICKLEN COMPANY, A CORPORATION OF ILLINOIS.

ODOMETER.

1,269,216.　　　　Specification of Letters Patent.　　Patented June 11, 1918.

Application filed August 5, 1913.　Serial No. 783,070.

*To all whom it may concern:*

Be it known that I, THEODORE C. PROUTY, a citizen of the United States, residing at Aurora, in the county of Kane and State of Illinois, have invented certain new and useful Improvements in Odometers, of which the following is a specification.

This invention relates to the class of revolution counters or indicators and particularly to mechanisms that are usually termed odometers as used in connection with speedometers, and which are adapted to indicate the distances traveled by road vehicles such as automobiles, motorcycles and the like, although, of course, it will be seen from the following description and an examination of the drawings, that the instrument may be used for many purposes other than in connection with road vehicles.

In the accompanying drawings, Figure 1 is a front view, partly in section of an instrument constructed in accordance with this improvement showing the trip indicator in one,—its registering operative position, and as used in connection with a speedometer for road vehicles;

Fig. 3 is a sectional detail view of the planetary gearing used in connection with the main gear and first or unit indicating wheel of the total or season register and taken on the line 3 of Fig. 1 looking in the direction of the arrow.

Fig. 4 is a perspective view of one side,—the side of one of the other indicating wheels taken on the line 4 of Fig. 1 and looking in the direction of the arrow.

Fig. 5 is a sectional detail view taken on the line 5 of Fig. 1 showing one of the indicating wheels with its internal annular gear in engagement with one of the intermediate Geneva-stop-counter pinions.

Fig. 6 is a detail view of the main driving gear, its integral supporting shaft, and spring clutch mechanism.

Fig. 7 is a detail view of the unit indicating wheel of the trip indicator with its supporting sleeve.

Fig. 8 is a perspective detail view of the indicating wheel shown in Fig. 4 and looking at the same side of the wheel.

Fig. 9 is a cross sectional view of the indicating wheel shown in Fig. 4 taken on the line 9—9.

Fig. 10 is a perspective view of one of the Geneva-stop-counter pinions.

Fig. 11 is a perspective view of one of the spring brackets for supporting one of the Geneva-stop-counter pinions in position.

Fig. 12 is a similar view of the bracket for supporting the modified Geneva-stop-counter pinion of the trip register.

Fig. 13 is a perspective view of the modified Geneva-stop-counter pinion, as used in connection with the trip register.

Figure 1:
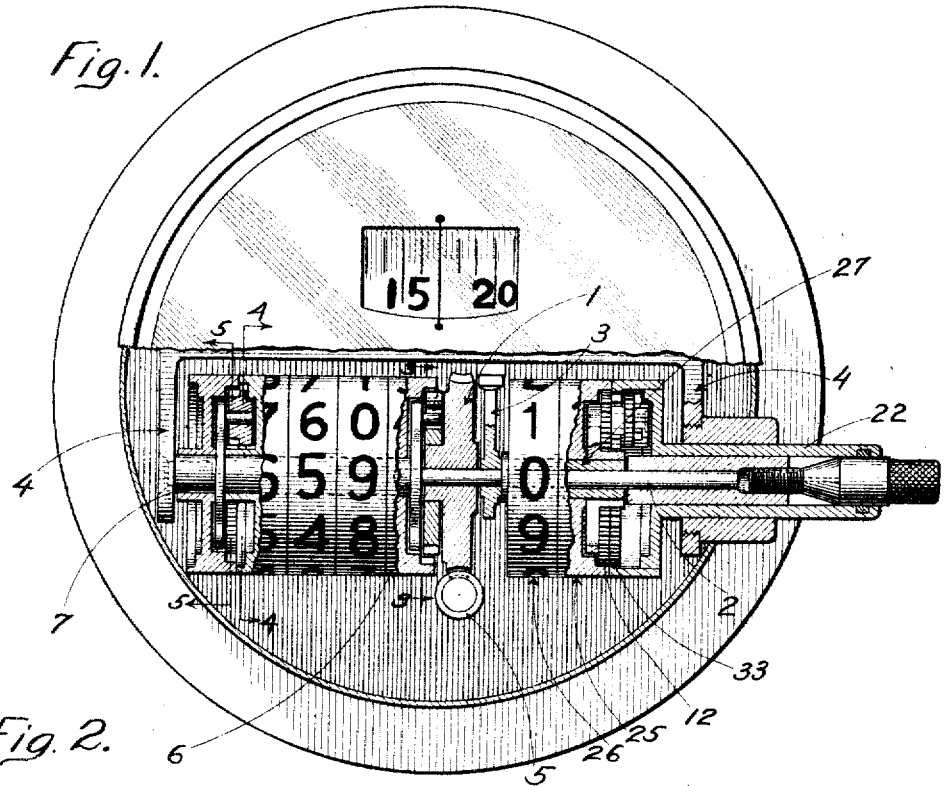

In designing an instrument in accordance with these improvements, it has been my desire to simplify the construction and arrangement in such manner as to enable the manufacturer to practice the greatest economy in manufacturing and at the same time give the user a simple serviceable instrument, one that can be easily repaired or any part thereof replaced, as necessity may demand or occasion may warrant.

In describing my improvement, I will first describe what I prefer to term the total or season indicating register, that is, the mechanism that registers the total number of miles.

In constructing an instrument in accordance with these improvements, I provide what I prefer to term a main driving gear 1, which is secured to, supported by and drives a master shaft 2 and mount it in a suitable arm or bracket 3 of the framework 4 of the instrument.

This gear is preferably a worm gear which intermeshes with and is driven by a worm 5 which worm may be in turn connected with any desired mechanism by means of a flexible or other shaft,—not shown, and which it is deemed unnecessary to disclose herein.

The first or unit indicating wheel 6 is rotatably mounted upon a supporting shaft 7 and preferably at one end thereof and its outer surface is provided with the desired figures or numerals from 1 to 10, registering from 1 to 10 miles traveled by the vehicle.

In order to register the movements of the main gear on this unit indicating wheel, that is to transmit power and motion at the desired speed of rotation, the main gear is provided with an eccentric hub 8, on one face thereof and upon this eccentric hub is loosely mounted an independent intermediate gyrating spur gear 9. This intermediate spur gear has an elongated slot 10' extending radially through one portion thereof and which in turn is engaged by a pin 10 extending outwardly from the supporting spring bracket 11. This arrangement is such that the intermediate spur gear is prevented from rotating with the main driving gear and instead of rotation is compelled to partake of a gyratory motion.

Figure 2:
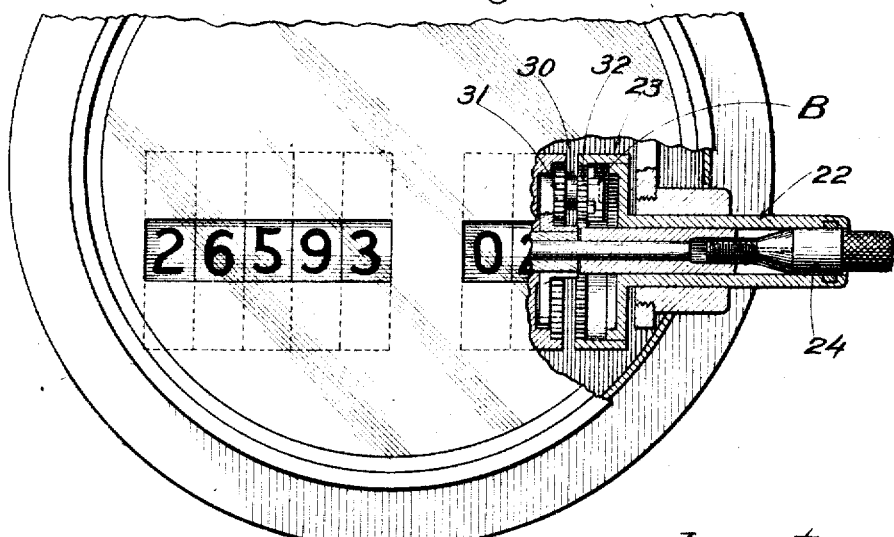
Fig. 2 is a similar broken view of the device, with the trip indicator partly in section and in its second or setting position.

The unit indicating wheel is chambered, as shown in Figs. 2 and 3 and is of the same shape and construction as the chamber shown at the right-hand of Fig. 9 and is provided with an internal annular gear having preferably 40 teeth. The independent gyrating gear, as it is deemed preferable to term it, is provided with 36 teeth and these two gears, gyrating and internal annular, are meshed with each other as shown in Fig. 3. It will be seen that as the eccentric is rotated in the direction of the arrow shown in Fig. 3, the gyrating gear is given a gyratory motion which causes its different teeth to engage with the teeth in the annular gear and crowd or force the indicating wheel in the same direction as the rotations of the eccentric hub and one-tenth of the rotation of the main gear; that is, with this construction and arrangement of gears, the unit indicating wheel of the season register will rotate just one-tenth of the speed of the main gear. Stated otherwise, the main gear will travel ten times as fast as the primary indicating wheel and supposing the main gear to travel at the rate of one rotation per mile, the primary indicating wheel will make one complete rotation in ten miles.

I next provide a plurality, that is, four adjacent indicating wheels all rotatably mounted upon the same supporting shaft 7. Each of these indicating wheels,—as shown particularly at the left hand end of Figs. 1 and 9,—is chambered on one side so as to provide internal annular gears 12, and on the other side with stepped chambers 13 having projections 14 and 15 and leaving an intermediate space 16—see Fig. 8.

To transmit power and motion from one of the right hand indicating wheels to its adjacent left hand neighbor, I use an intermediate spur pinion A,—preferring for that purpose pinions of the Geneva stop-counter type,—as shown particularly in Figs. 1, 4 and 10. This pinion is rotatably mounted upon the pin 10 of a bracket 11,—which in turn is split so as to frictionally engage the supporting shaft 7 which prevents its rotation—and is further provided at one end with spur teeth 17 and the other end with three teeth 18, equi-distantly disposed, that is 120° from each other. At about the center of the pinion are three outwardly extending lugs 19, also equi-distantly disposed, one arranged between each of the secondary teeth 18. The pinion teeth 17 of the Geneva-stop-counter pinion A, engage with the internal annular gear of the first driven indicating wheel at all times and when such wheel is stationary or not being moved, two of the secondary teeth are extended under the surface or shoulder 20 of the opposite or driving indicating wheel while one of the lugs 19 project upwardly in the path of the lugs 14 and 15. The arrangement is such as the driving indicating wheel rotates or has completed one rotation. The lug 14 first strikes one of the lugs 19 on the intermediate pinion and partially rotates it so that the secondary tooth 18 enters the space 16 between the lugs 14 and 15. The continuation of rotation of the driving wheel carries the pinion around farther until the next lug 19 comes up outside of the lug 15, placing two of the secondary teeth 18 in contact with the shoulder surface 20, preventing any further rotation of this intermediate pinion until the said driving wheel has made another complete rotation,—see Fig. 4. This operation moves the next adjacent secondary indicating wheel one-tenth of a revolution.

The other indicating wheels are provided with similar mechanism so that one description is sufficient for all of the sets and enables those skilled in the art to practice the invention without further instruction as to details.

In this particular art it is not only essential to use in connection with a speedometer, a season register or indicator, but it is absolutely necessary to provide a trip indicator also, that is, an indicator that will give the run in miles for the day, or when used in connection with other devices, the number of desired operations for the day, so that particular daily trip counts may be kept when it is desired or necessary so to do. In fact it is not only necessary so to do, but it is almost impossible to sell a device that is not provided with a so-called trip, as well as a season register.

In order to provide a trip register as above suggested, the master shaft 2 is provided with an enlarged bearing and clutch portion 21, upon which is mounted a sleeve 22 carrying upon its inner end the tenths indicating wheel 23 of the trip indicator. The enlarged bearing and clutch portion 21 of the master shaft is provided with an internal threaded and tapered bore and at the same time is radially split as shown at 23' in Fig. 6. A threaded and tapered plug 24 is provided, the threaded portion of which engages with the threaded bore of the master shaft, so that as it is moved inwardly it contacts the tapered bore of the master shaft and spreading it, forces it into locking engagement with the sleeve 22 carrying the primary indicating wheel. This construction and arrangement is for the purpose of enabling the user to disengage the tenths wheel of the trip indicator, when necessary, from the master shaft to give it independent longitudinal and rotary movements, all of which will be more fully hereinafter explained.

The trip indicator consists further of two additional indicating wheels 25 and 26, the first of which registers up to ten miles and the second registering up to 100 miles, the primary indicating wheel making one rotation for every mile traveled by the road vehicle, and being provided with numerals to register the fractions of a mile.

It will be seen when the parts are locked together, that is, the master shaft and the sleeve of the tenths indicating wheel trip register, that the tenths wheel will rotate synchronously or in unison with the main gear in and at the same rate of speed. In order to transmit power and motion, to move or rotate the secondary indicating wheels 25 and 26 by and during the movement of the primary indicating wheel 23, a modified Geneva-stop-counter pinion B is provided, as shown particularly in perspective view in 13. This intermediate stop-counter pinion is substantially or generally of the same construction and arrangement as the stop-counter pinion shown in Fig. 10 with additional features which will be hereinafter set forth. For the present it is sufficient to say that when in normal operation, as shown in Fig. 1. it communicates power and motion to the secondary indicating wheels in just the same manner as is described in connection with the intermediate counter pinion so that repetition of the description thereof at this point is deemed unnecessary. It is mounted upon a sleeve bracket 27, shown particularly in Fig. 12, which bracket is in turn mounted upon the bearing sleeve 29, shown in the right-hand of Fig. 1 and upon which bearing sleeve the units and tens rotating wheels are rotatably mounted. These secondary indicating wheels 25 and 26 are constructed in all essential respects similar to the indicating wheels described in connection with the season indicators, as shown in Figs. 4, 5, 8 and 9, so that any further description thereof at this point is deemed unnecessary. It is sufficient to say that for every rotation of the tenths indicating wheel of the trip register through the intermediate gear mechanism, the next adjacent indicating wheel is given one-tenth of a rotation as for every ten rotations of the primary indicating wheel of the trip register. The secondary indicating wheel 25 is given a complete rotation and the indicating wheel 26 given one-tenth of a rotation, all of which is understood and appreciated by those skilled in this particular art.

It is desired, however, many times during a trip to reset the trip register—principally to bring into accord with the mileage of a change of routes or to make any other necessary corrections. Unless some such means is provided it is impossible to do so and the driver would have to go to the end just simply piling up the miles without having any opportunity to check up against desired locations. In order to provide easy means for resetting the trip indicator any desired mileage, the tenths indicating wheel is constructed as already described so that it may be disconnected from the master shaft and given independent longitudinal or rotary movements, all of which has hereinabove been fully described.

In order to facilitate the resetting of the units and tenth wheels, the Geneva stop-counter pinion B (see Fig. 13) is provided with an annular groove 30 that separates the two pinion portions 31 and 32. This arrangement is such that the toothed portion 31 is at all times in engagement with the internal annular gear 12 of the secondary indicating wheel. The tenths indicating wheel is also provided with an inwardly extending annular toothed gear 33, and so arranged that when the trip indicating mechanism is being normally operated this gear moves in the annular groove 30 of the counter-pinion, but when the sleeve 22 with its primary indicating wheel is pulled out it causes an intermeshing engagement of the annular gear 33 with the second toothed portion 32 of the stop-counter pinion, while the secondary teeth and projecting lugs thereof are released from engagement with said wheel. By this arrangement it will be seen that the tenths indicating wheel and the next adjacent indicating wheel may be rotated in unison and any desired setting or resetting of the trip indicator effected. Of course, it will be understood by those skilled in the art that it is desirable to first bring the tenths indicating wheel and its next adjacent indicating wheel into alinement as to numbers, say, such as 9, 6 or 3 before pulling the trip indicating wheel to its outer limit of motion; then it is a comparatively easy matter to bring the two indicating wheels into numerical alinement with the third wheel. When this is accomplished all that it is necessary to do is to push the tenths indicating wheel into its inner limit of motion, as shown in Fig. 1, and lock the parts together by tightening the screw plug 24, all of which will be understood and appreciated by those skilled in the art.

I claim:

1. In an instrument of the class described, in combination, a chambered indicating wheel, means to rotate said wheel in accord with a rotating element, a second chambered indicating wheel located adjacent said first named wheel and provided with an internal annular gear, an intermediate pinion for transmitting motion from said first named wheel to said second named wheel, means to maintain said pinion in operative position, said means comprising a bracket provided with a pin, said pinion being rotatively mounted upon said pin, a shaft, said indicating wheels being rotatably mounted on said shaft, said bracket being provided with a split portion frictionally engaging said shaft.

2. In a device of the class described, an indicator wheel, a second indicator wheel located adjacent thereto, said wheels being rotatably mounted on a supporting member, means to rotate said first named indicator wheel, the latter being chambered on one side and provided with an internal annular shoulder, projections carried thereby, said second named indicator being provided on its adjacent face with an internal annular gear, a pinion rotatably mounted and extending between said first and second named indicators, said pinion being provided with a gear portion meshing with the teeth of said internal annular gear and being further provided with projections adapted to be engaged by said projections of said first named indicator upon rotation of the latter to effect rotation in any desired proportion of the second named indicator, said pinion being further provided with a second gear portion engageable at the will of the operator with said gear portion of said primary wheel.

3. In a device of the class described, indicating wheels, means to rotate one of said wheels, and means operatively connecting said wheels to transmit the rotation of one to the other in a desired ratio, said means being constructed and arranged to transmit the rotation of said first-named wheel to said other wheel at the same rate when desired.

4. In a device of the class described, indicating wheels, means to rotate one of said wheels, and means operatively connecting said wheels to transmit the rotation of one to the other in a desired ratio, said means being constructed and arranged to transmit the rotation of said first-named wheel to said other wheel at the same rate when desired, said means and one of said wheels being relatively movable to effect rotation of either kind.

5. In an instrument of the class described, indicating mechanism comprising a master shaft, means to rotate said shaft, an indicating wheel concentrically mounted on said shaft and adapted to be rotated thereby, and clutch mechanism for locking said first-named indicator to said shaft, said clutch mechanism being also constructed to unlock said indicator from said shaft when so desired to permit manual adjustment of the same, said indicator being provided with an extended manually engageable portion.

6. In a device of the class described, indicating mechanism comprising a master shaft, means to rotate the same, said shaft being provided with an enlarged portion at its outer end, said portion being split and provided with an internally threaded and tapered bore, a primary indicator wheel, a supporting sleeve carried thereby and mounted upon said enlarged portion of said shaft, and a tapered locking plug engaging the threaded tapered bore of the master shaft, said plug being operative to lock said indicator wheel to, or unlock the same from said shaft.

7. In a device of the class described, a master shaft, means to rotate the same, a chambered indicating wheel, a secondary chambered indicating wheel located adjacent thereto, said wheels being provided with internal annular gearing, said first named indicator being further provided with actuating lugs, a rotatably mounted pinion arranged between said indicators, said pinion being provided with a toothed portion engaging said internal annular gear of said second named indicator, said pinion being further provided with a second toothed portion and also engageable teeth arranged to be actuated by said lugs of said first named indicator whereby rotation of the latter will proportionately rotate the second named indicator, and means to lock said first named indicator to said master shaft whereby the latter will effect rotation of the former, said means being arranged to permit unlocking of said members, said first named indicator being arranged to permit movement thereof when unlocked from said master shaft to effect meshing of its internal annular gear with said second toothed portion carried by said portion, said lugs being out of engagement with said pinion when such meshing is effected whereby rotation of said primary indicator will rotate said second named indicator at the same time.

8. In an instrument of the class described, a trip indicator comprising a main driving gear, a master shaft integrally secured thereto and upon which it is supported and which it drives in turn, a chambered indicating wheel provided with a sleeve slidably and rotatably mounted on the outer end of said master shaft, means for locking said master shaft and the sleeve of the primary indicating wheel together so that they will rotate and move in unison, a second chambered indicating wheel rotatably mounted around said master shaft, provided with an annular gear, a bracket on said master shaft provided with a supporting pin, an intermediate pinion for transmitting power and motion from the said first named wheel to said second named wheel and mounted upon said supporting bracket and having one toothed pinion portion engaging the internal annular gear of said second named indicating wheel and with a second toothed portion separated from the first-named toothed portion by an annular groove, and an internal annular gear on said first named indicating wheel normally operating in the annular groove of the last named intermediate counter-pinion but arranged to engage with the second toothed portion of said pinion when it is in unlocked engagement with the master shaft and slid to its outer limit of motion so as to operate or rotate said primary indicating wheel and the first of the second indicating wheels in unison for the purposes of adjustment and resetting of the said indicating wheels.

9. A trip register provided with a chambered indicating wheel arranged to have independent rotary and slidable movements, a second chambered indicating wheel arranged to have rotary movements only, an internal annular gear on the chambered portion of each of the aforesaid indicating wheels, an intermediate pinion having a toothed portion in engagement with the internal annular gear of the second indicating wheel, and a second toothed portion arranged to be thrown into and out of engagement with the internal annular gear of the first-named indicating wheel during the longitudinal movements of said primary indicating wheel so that said wheels can have a given ratio of rotation or be moved in unison.

10. In an instrument of the class described, an indicator wheel, means to actuate said indicator, said means comprising a rotatable shaft, a clutch member carried thereby, and a plug member arranged to operate said clutch member, said operating indicator being provided with a sleeve surrounding said clutch member whereby operation of said plug will engage said clutch member with said sleeve for rotation of said indicator by said shaft.

11. In an instrument of the class described, an indicator wheel, means to actuate said indicator, said means comprising a rotatable shaft, a clutch member carried thereby, and a plug member arranged to operate said clutch member, said operating indicator being provided with a sleeve surrounding  id clutch member whereby operation of said plug will engage said clutch member  ith said sleeve for rotation of said indicator by said shaft, said sleeve being provided with a manually engageable portion for setting of said operating indicator.

In testimony whereof, I have subscribed my name.

THEODORE C. PROUTY.

Witnesses:
Thomas Francis Sheridan,
Henry A. Parker.